United States Patent Office 3,563,095
Patented Feb. 16, 1971

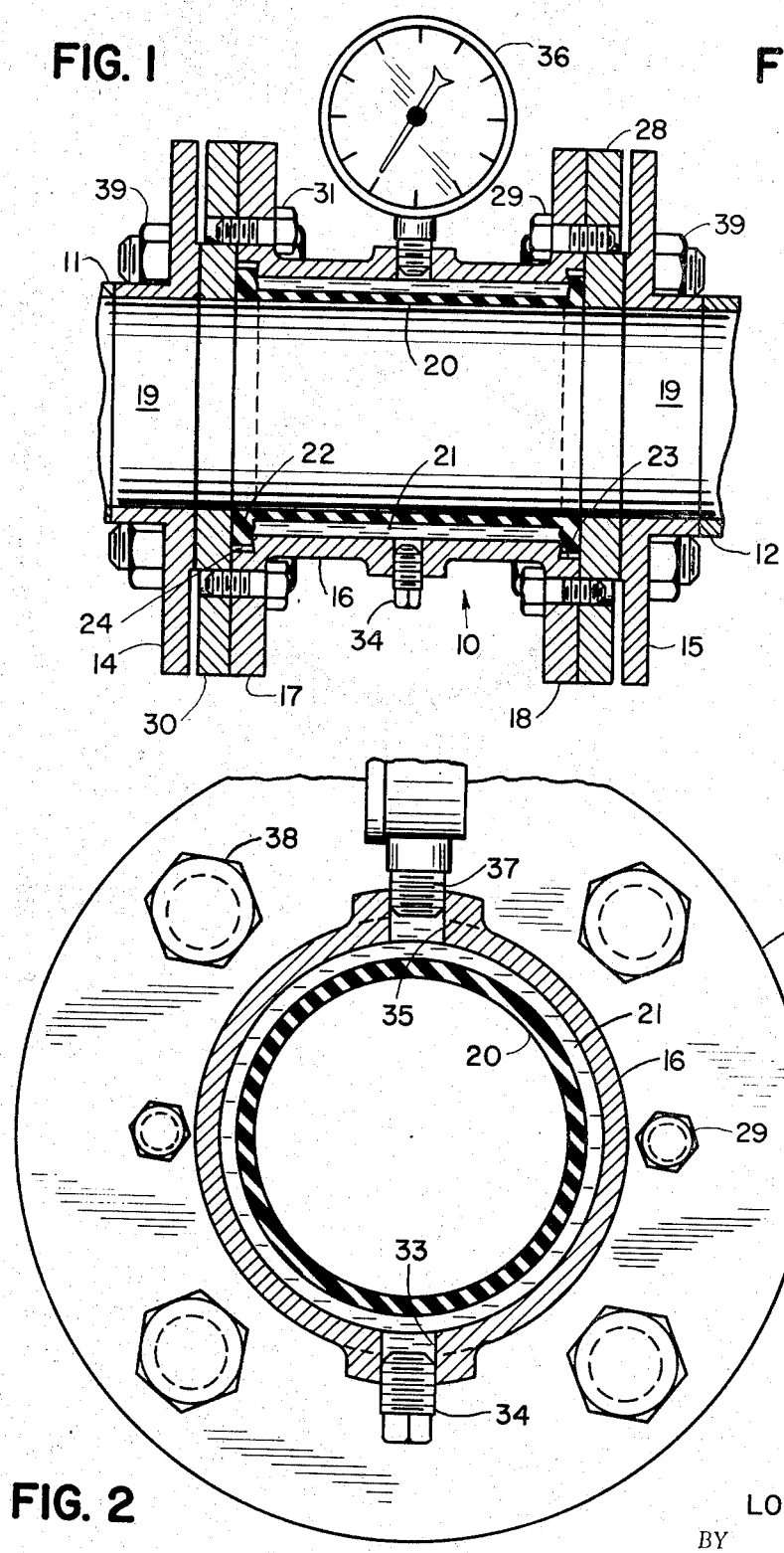

3,563,095
FLUID PRESSURE SENSOR
Lonnie O. Robinson, Jr., Kalamazoo, Mich., assignor to Dover Corporation, Cincinnati, Ohio, a corporation of Delaware
Filed Jan. 6, 1969, Ser. No. 789,142
Int. Cl. G01l 7/00
U.S. Cl. 73—406                    10 Claims

ABSTRACT OF THE DISCLOSURE

A device for sensing the pressure in a fluid line passage includes a tubular sleeve, which is formed of a flexible and resilient material, having its inner diameter the same as the diameter of the fluid line passage. The sleeve has flanges on each end disposed within recesses in each end of a mounting body for the sleeve. Each recess is formed so that its entrance opening for the flange of the sleeve is smaller than any other portion of the recess whereby the flange is retained within the recess.

---

In fluid carrying lines, it is desired to be able to measure the pressure of the fluid within the line without interrupting the flow thereof and without subjecting the pressure sensing device to the fluid, which might be an acid, for example. In order to insure a relatively smooth flow between the two sections of the fluid line between which the pressure sensing device is interposed, it is necessary for the sensing device to have its internal diameter the same as the diameter of the fluid line passage.

It has previously been suggested to utilize a sensing device having a flexible member, which has one side subjected to the pressure of the fluid in the line and the other side forming a wall of a chamber in which a non-compressible liquid is disposed. The present invention is an improvement over the previously suggested sensing device in that the present invention utilizes a specific retaining arrangement for the flexible member, which has its internal diameter the same as the diameter of the fluid line passage. Thus, the present invention insures that the tubular flexible member does not pop out of its retaining means, during assembly or use.

In one previously suggested sensing element, the flexible tubular member extended for a substantially greater length than the chamber having the non-compressible liquid therein with which the flexible tubular member formed a wall thereof. Thus, in the previously suggested arrangement, only a very small portion of the flexible tubular member was effective for sensing the pressure of the fluid flowing through the line.

In the present invention, substantially the entire length of the flexible tubular member is effective to act on both the noncompressible liquid and to be responsive to the fluid flowing through the fluid line. Thus, a larger area is sensed so that more accurate pressure sensing may be obtained.

Accordingly, the present invention permits a flexible tubular member to be mounted with substantially its entire length forming a wall of a chamber having fluid such as a non-compressible liquid, for example, therein. This arrangement also permits substantially the same length of the tubular member to be exposed to the pressure of the fluid being sensed.

In the previously suggested arrangement, it was necessary to utilize flanges on portions of the fluid line to retain the flanges of the flexible tubular member in position. Thus, the previously suggested sensing device required skilled installers to mount the sensing device in the fluid pressure line. There was no manner in which the sensing device could be manufactured as a separate unit and then merely connected by unskilled labor to parts of the fluid line.

Accordingly, in the previously suggested sensing element, incorrect installation of the sensing element could not be readily ascertained nor could there be any testing of the sensing element prior to its installation. The present invention overcomes these problems by permitting testing of the sensing device before it leaves the factory and having the device completely assembled prior to shipment.

An object of this invention is to provide a fluid pressure sensing device including means for retaining a sensing sleeve in position.

Another object of this invention is to provide a self-contained pressure sensing unit for use with fluid lines.

Other objects, uses, and advantages of this invention are apparent upon a reading of this description, which proceeds with reference to the drawing forming part thereof and wherein:

FIG. 1 is a longitudinal sectional view of the pressure sensing device of the present invention disposed in a fluid line.

FIG. 2 is a sectional view of the device of FIG. 1.

FIG. 3 is an enlarged sectional view of a portion of the pressure sensing device of FIG. 1 prior to assembly.

FIG. 4 is a sectional view, similar to FIG. 3, but showing the structure of FIG. 3 assembled.

Referring to the drawing and particularly FIG. 1, there is shown a pressure sensing device 10 adapted to be disposed between portions 11 and 12 of a fluid line through which fluid flows and connected thereto. The portion 11 has an annular plate 14 on its end for attachment of one end of the pressure sensing device 10, adapted to be connected and the portion 12 of the fluid line has an annular plate 15 on its end for attachment of the opposite end of the pressure sensing device 10. The plates 14 and 15 are preferably secured to the portions 11 and 12, respectively, by welding.

The pressure sensing device 10 includes a hollow body 16, which is substantially cylindrically shaped in its central portion, having annular flanges 17 and 18 on opposite ends thereof. The body 16 has its inner diameter substantially larger than the diameter of fluid line passage 19 through which the fluid flows.

A tubular sleeve 20, which is substantially cylindrically shaped, is disposed within the body 16 and has an external diameter smaller than the inner diameter of the body 16 to provide a space therebetween for an annular chamber 21. The sleeve 20 has annular flanges 22 and 23 on opposite ends thereof to form the ends of the chamber 21 when the flanges 22 and 23 are retained in the body 16.

The sleeve 20 is formed of a flexible elastomer material such as rubber, for example, so as to be responsive to the pressure of the fluid flowing therethrough. The sleeve 20 also must be formed of a material that is not subject to deterioration, corrosion, or the like from the fluid flowing through the passage 19 in the portions 11 and 12 of the fluid line.

One end of the body 16 is formed with an annular recess 24 to receive the flange 22 of the sleeve 20. The other end of the body 16 is formed with an annular recess 25 to receive the flange 23 of the sleeve 20.

As shown, in FIG. 4, the recess 25 is formed by a wall 26, which is disposed substantially concentric to the longitudinal axis of the body 16 and the sleeve 20. The recess 25 also is formed by a second wall 27, which is disposed at an acute angle to the wall 26 whereby the entrance opening to the recess 25 for the flange 23 is smaller than any other portion of the recess 25.

When an annular sealing ring or plate 28, which has an opening therein of the same diameter as the passage, 19, is secured to the flange 18 of the body 16 by suitable means such as screws 29, the flange 23 is retained within the recess 25 and will not pop out, during assembly or use.

Tests have indicated that the acute angle between the walls 26 and 27 is preferably 88°20'. This is particularly effective where the entrance opening, which is between the end of the body 16 and the sealing ring or plate 28, has a length of 3/16" and the original width of the flange 23, as shown in FIG. 3, is 1/4".

The relationship of walls 26 and 27 must be such that the flange 27 may be compressed by the sealing ring or plate 28 within the recess 25. Thus, if the acute angle is too small, there will not be sufficient compression of the flange 23 when the ring or plate 28 is secured to the flange 18 of the body 16. Likewise, if the acute angle is made larger than 88°20', there will not be sufficient compression. It is believed that the acute angle should not be less than 87°.

The annular recess 24 is formed in the same manner as the annular recess 25 and has its walls formed with the same acute angle relation. Thus, these will not be described in detail.

An annular sealing ring or plate 30, which is secured to the flange 17 by suitable means such as screws 31, for example, and has an opening therein of the same diameter as the passage 19, cooperates to retain the flange 22 of the sleeve 20 within the recess 24. This is in the same manner as the sealing ring or plate 28 retains the flange 23 of the sleeve 20 in the recess 25.

As shown in FIG. 3, the sleeve 20 is molded with a concave portion on its inner surface in the area having the flange 23. The other end of the sleeve 20 is similarly formed in the area having the flange 22. These concave portions result in the inner surface of the sleeve 20 being substantially smooth and aligned with the inner surfaces of the sealing rings or plates 28 and 30 and the fluid line passage 19. Without the concave arrangement, there would tend to be some bulging of the sleeve 20 to affect the turbulence of the fluid flowing within the fluid line passage 19.

Fluid is introduced into the chamber 21 through a threaded port or aperture 33, which is closed by a fill plug 34. The fluid must be capable of responding to movement of the sleeve 20 due to changes in the pressure of the fluid flowing through the sleeve 20. The fluid may be a non-compressible liquid such as water, for example.

The body 16 has a second threaded port or aperture 35 therein and diametrically disposed to the port 33. A pressure gauge 36 has its coupling 37 threaded into the port 33. A pressure gauge 36 has its coupling 37 threaded into the port 35. As a result, the pressure gauge 36 indicates the pressure of the fluid within the chamber 21. Thus, as the fluid flowing through the interior of the sleeve 20 increases in pressure, the fluid in the chamber 21 is put into compression whereby the pressure of the fluid within the chamber 21 increases. When the pressure of the fluid flowing through the interior of the sleeve 20 decreases, the fluid in of the chamber 21 is relieved of compression whereby the pressure of the fluid within the chamber 21 decreases; this is indicated by the gauge 36.

The body 16 is secured to the portion 12 of the fluid line by bolts 38, which extend through aligned openings in the flange 18 of the body 16, the sealing ring or plate 28, and the annular plate 15 on the portion 12 of the fluid line. The bolts 38 are retained by nuts 39. A similar arrangement exists for securing the plate 14 of the portion 11 of the fluid line, the sealing ring or plate 30, and the flange 17 of the body 16.

Thus, a different securing means is utilized to secure the device 10 to the portions 11 and 12 than is employed to secure the flanges 22 and 23 of the sleeve 20 in the desired portion within the body 16. This arrangement allows the device 10 to be completely assembled at the factory and tested before installation in a fluid line.

While the pressure gauge 36 has been shown as indicating the pressure of the fluid within the chamber 21 so as to indicate pressure within the fluid line passage 19, it should be understood that any other type of indicating means may be employed. Additionally, the fluid in the chamber 21 could be connected with a remote indicating means rather than an indicating means attached to the body 16.

While the sensing device 10 has been described as being secured to the portions 11 and 12 by being connected to the plates 14 and 15, it should be understood that other suitable means for securing the sensing device 10 to the portions 11 and 12 may be employed. For example, the sealing rings or plates 28 and 30 could be formed with threads on their inner surfaces and connected to threaded ends of the portions 11 and 12.

An advantage of this invention is that the sensing sleeve of a pressure sensing device is positively retained in position. Another advantage of this invention is that the sensing device may be completely assembled at the factory.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A self-contained device adapted to be disposed within a fluid line to sense the pressure of fluid in the passage of the fluid line, said device including a hollow body having an internal diameter greater than the diameter of the fluid line passage, a sleeve disposed within said body and having an internal diameter substantially equal to the internal diameter of the fluid line passage, said sleeve having an external diameter less than the internal diameter of said body whereby said sleeve is spaced from said body, said sleeve being formed of a flexible and resilient material, said sleeve having an outwardly extending annular flange on each end thereof, said body having an annular recess formed at each end thereof, each of said recesses receiving one of said flanges, each of said annular recesses being formed in said body by a first wall substantially concentric to the longitudinal axis of said body and a second wall disposed with respect to said first wall at an acute angle to form an entrance opening to said recess of smaller length than said first wall, means secured to each end of said body to retain each of said flanges of said sleeve within each of said recesses in said body, said sleeve and said body cooperating to form a chamber therebetween when said flanges of said sleeve are disposed within said recesses in said body, said chamber having a fluid therein, and means to sense the pressure of the fluid within said chamber whereby the pressure of the fluid in the fluid line passage is sensed.

2. The device according to claim 1 in which said acute angle is 88°20'.

3. The device according to claim 1 in which said acute angle is no smaller than 87°.

4. The device according to claim 1 in which the fluid within said chamber is a non-compressible liquid.

5. The device according to claim 2 in which the fluid within said chamber is a non-compressible liquid.

6. The device according to claim 3 in which the fluid within said chamber is a non-compressible liquid.

7. The device according to claim 1 wherein the inner surface of said sleeve contains a concave portion in the area of said flange prior to mounting said flanges in said recess.

8. The device according to claim 1 including means for securing said self-contained device within a fluid line.

9. The device according to claim 1 wherein said sleeve has substantially its entire length forming of wall of said chamber.

10. The device according to claim 1 in which said acute angle is no greater than 88°20′.

References Cited

UNITED STATES PATENTS

| 2,537,308 | 1/1951 | Hansen | 92—99X |
| 2,567,071 | 9/1951 | Jacobus | 92—99X |
| 3,163,529 | 12/1964 | Jewett | 73—406 |

DONALD O. WOODIEL, Primary Examiner

U.S. Cl. X.R.

73—395